Dec. 11, 1951 C. F. DIMITRUK 2,578,404
DEVICE FOR CUTTING BOTTLE SEALS
Filed May 19, 1949

Inventor
Charles F. Dimitruk
Wooster Davis Attorneys

Patented Dec. 11, 1951

2,578,404

UNITED STATES PATENT OFFICE 2,578,404

DEVICE FOR CUTTING BOTTLE SEALS

Charles F. Dimitruk, Ansonia, Conn.

Application May 19, 1949, Serial No. 94,239

6 Claims. (Cl. 30—2)

This invention relates to a bottle-seal cutting device.

The principal object of this invention is to provide a simple and effective bottle-seal cutter having an inexpensive and removable blade.

Corked and capped bottles, especially those used in the wine and liquor industry, are frequently capped or sealed with a foil or plastic covering over the mouth and neck.

Another object of this invention is to provide a convenient cutting tool which is inexpensive to manufacture, sufficiently flexible to fit practically any size bottle, easy to operate, and the blade of which is quickly and inexpensively changeable.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 5:
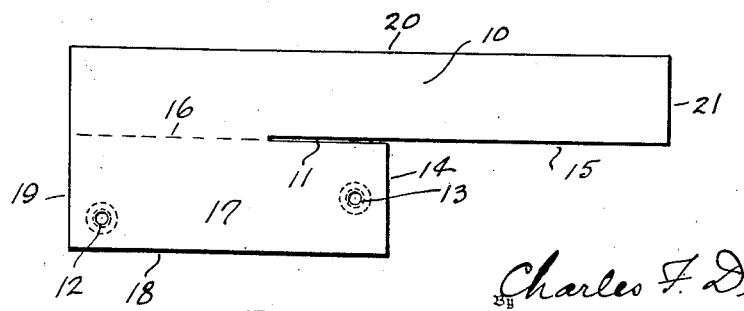
Fig. 5 is a top plan view of the main body portion.

As shown in the drawing, Fig. 5, in making the device a flat piece of metal or other suitable material is formed to comprise a laterally extended portion 10, two screw threaded holes 12 and 13, a narrow slit 11 extending inwardly for a short distance from edge 14 and in continuation of edge 15 of exteneded portion 10.

Portion 10 is then bent downwardly at dotted line 16 to form an approximate 90° angle with portion 17. The flat surface 17 containing screw threaded holes 12 and 13 forms a rectangular portion between edge 18 on one side, line of bending 16 and slit 11 on the opposite side, edge 14 on one end and edge 19 on the opposite end. The rectangular flat surface 17 thus described comprises the blade holder. The rectangular portion 10 bounded by edge 15 and a line inwardly in continuation thereof along the bend at dotted line 16, and edges 19, 20 and 21 comprise the bottle neck engaging portion.

Figure 2:
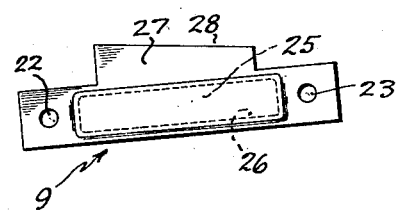
Fig. 2 is a top plan view of the blade clamp portion.
Figure 3:
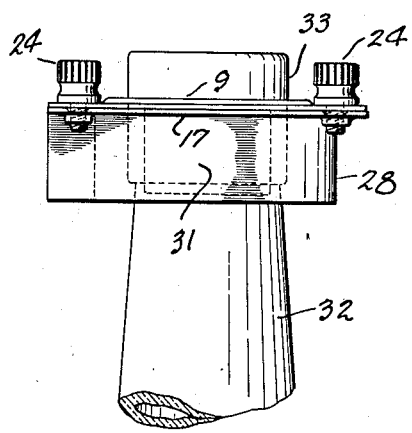
Fig. 3 is a side elevation showing the relation of the tool or opener to a bottle neck.
Figure 4:
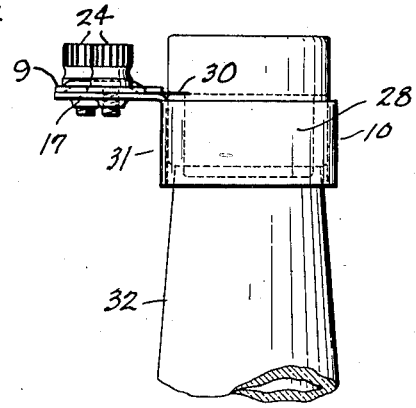
Fig. 4 is an end view of Fig. 3.

A blade clamping portion 9, Fig. 2, made of metal or other suitable material, such as plastic, is formed with two holes 22 and 23 having the same center line distance as the screw threaded holes 12 and 13 in surface 17, Fig. 5, and of suitable diameter to take a screw 24, Figs. 3 and 4, to engage the screw threaded holes 12 and 13 of the blade holder portion, Fig. 5, when the blade clamping portion is connected with the said blade holder.

A rectangularly shaped depression 25, Fig. 2, is formed in the under side of the blade clamp portion between holes 22 and 23, said depression being of suitable depth, size and shape to allow the thick edge of a common single edge safety razor blade to rest within said depression. Dotted line 26 indicates internal space dimensions of the depression 25.

Figure 1:
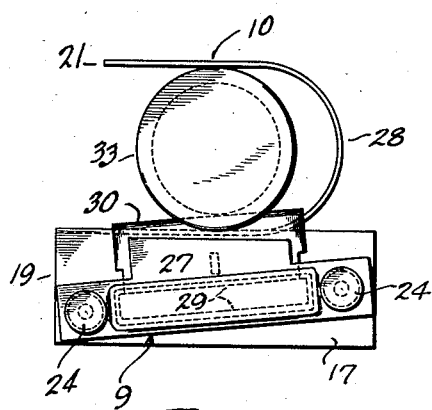
Fig. 1 is a top plan view of the cutting tool or opener in operating position about the neck of a bottle.

Integrally formed with said blade clamp 9 is a blade cover 27 having an outer edge 28 at an angle of such degree as to run approximately parallel to slit 11 and dotted line 16 of Fig. 5 when said blade clamp is connected in operating position by screws 24 to blade holder portion 17, as can be seen in Fig. 1.

Bottle neck engaging portion 10 is bent outwardly from the blade holder portion 17, beginning the bend near the internal end of slit 11 and around an arc of approximately 180° to form a U shape of such suitable size as most seal covered bottles may require. The bottle neck engaging portion being free at extremity 21, the dimension of the arc 28 is sufficiently flexible to engage bottle necks of various sizes and sufficiently flexible to engage necks of practically all wine and liquor bottles now in common use, and due to the resiliency of the metal or other material forms a spring grip for the bottle neck.

An ordinary single edge safety razor blade 30 having a thick blunt edge 29, Fig. 1, opposite the cutting edge is laid flat on the blade holder 17, with its cutting edge overlapping slit 11 (Fig. 1) and extending towards bottle neck engaging portion 10, its thick or noncutting edge resting between screw threaded holes 12 and 13.

The blade clamp 9 is then laid on the blade so that depression 25 in the underside of said blade clamp will fit over the thick blunt edge 29 of the razor blade 30, its holes 22 and 23 aligning with screw threaded holes 12 and 13 of the blade holder and its blade cover portion 27 resting flatly on a portion of the flat side of the razor blade. Two screws 24 engage the blade clamp, blade, and blade holder, rigidly connecting them together in operating position.

In operation, the neck 32 of a bottle is placed within the U-shaped bottle neck holding portion

10 so that the cutting edge of the blade contacts the exact place on the bottle seal 33 where cutting is desired, which is usually the joint between the head of the edge of the cap of the cork or other closure and the end of the bottle neck. The device can be raised or lowered and positioned at any desired place along the bottle neck and the blade pressed into the bottle seal at the point desired, although most operators will prefer to cut directly under the cork or screw cap of the bottle. The bottle is held in one hand and the cutting tool above described grasped in the other hand between thumb and forefinger, the thumb being placed on the upright portion 31 and the first or index finger on the outer portion 10 of the spring clip on the opposite side of the cap or bottle neck. By pressing together the flexible end at edge 21 of portion 10 and the opposite end of portion 10 under the blade holder at edge 19 so as to cause the blade to puncture the bottle-seal and cut through it, the bottle may then be rotated while the cutting tool is held tightly compressed or the tool may be tightly compressed around the bottle neck and rotated while the bottle is rigidly held. A complete rotation around the bottle neck will completely sever the seal.

Having thus set forth the nature of my invention, I claim:

1. A bottle seal cutter comprising a bottle neck holding portion comprising laterally spaced side members disconnected at one end and connected by a curved portion at the other end whereby the neck of a bottle may fit within said curved portion, said bottle neck holding portion being connected with a blade holder adjacent to one of its exterior sides and at approximately right angles thereto, said blade holder being provided with a screw threaded hole near each end at the top thereof, a blade clamp having a hole at each end, said holes being of same center line distance as the screw threaded holes in the blade holder portion so as to align with the threaded holes of the blade holder, and said blade clamp having an elongated rectangular depression between said holes, said blade clamp being also provided with a laterally extended and integrally formed blade cover, a cutter blade rigidly clamped between the blade holder and the blade clamp so that a portion of its cutting edge protrudes over the edge of the blade holder into the space defined by the bottle neck holding portion and provided with a thickened edge portion seated in the depression of the clamp, said blade holder, blade and blade clamp being rigidly connected and held together by a screw at each end engaging the holes of the blade clamp with the screw threaded holes of the blade holder whereby the neck of a bottle may be positioned within the holder, the protruding edge of the blade brought in contact with the seal over the bottle neck and by compressing the device tightly around the bottle neck and rotating it around the bottle thereby cut through the seal.

2. A bottle seal cutting device comprising a bottle neck holding portion connected with a blade holder adjacent to one of its exterior sides and at right angles thereto, a removably connected blade clamp having in its under side a rectangularly shaped depression, an integrally connected blade cover portion rigidly connected with said blade clamp and laterally extending outwardly from one side of said blade clamp, a cutter blade having a thickened edge portion seated in said depression, means for clamping the blade rigidly between said blade holder and said blade clamp so that a portion of a cutting edge of the blade protrudes over the interior edge of the blade holder into the interior of the bottle neck holding portion whereby the neck of a bottle may be engaged within said bottle neck holding portion so that the seal covering the bottle neck can be perforated by compressing the cutting edge of the blade with the neck engaging portion and by rotating the bottle against the cutting edge of the blade cause the seal to be completely severed.

3. A bottle seal cutting tool comprising a bottle neck holding portion formed to a substantial U-shape spring clip whereby the neck of a bottle may be held within its arc-shaped portion, a blade holding portion integrally and laterally connected with one side of the bottle neck holding portion and at substantially right angles thereto, and said blade holder including means for clamping a razor blade rigidly to the surface of said blade holder with its cutting edge extended within said arc in operative position so as to puncture a bottle seal covering and cut all around said seal as the tool is rotated around the circumference of the bottle neck.

4. A bottle-seal cutter for cutting foil and plastic bottle neck seals, bottle neck covering and the like, comprising a substantially U-shaped bottle neck holding portion, a connected blade holder extending laterally at substantially right angles from one side of said neck holding portion, a blade clamp, means for rigidly and removably connecting said blade clamp to the blade holder, a safety razor blade removably clamped in operating position with its cutting edge extending over the space defined by the U-shaped portion and rigidly held between the blade holder and blade clamp by the clamping means so that the blade can be easily and quickly changed, whereby the neck of a bottle may be placed within the U portion of the device, the cutting edge of the blade can be pressed into the seal or covering of the bottle and the device rotated as compression is simultaneously applied to puncture the seal, completely cut and sever the seal or other neck covering of the bottle.

5. A bottle-seal cutter comprising a body including an upright portion to engage one side of a neck of a bottle and a curved spring portion extending laterally from the first portion to engage the opposite side of said neck, said body also including a laterally extending support, and a releasable clamp for securing a cutting blade on said support with its cutting edge overlapping the space between said portions to cut the seal.

6. A bottle-seal cutter comprising a body including an upright portion and a laterally extending support, a resilient portion curved laterally from said upright portion forming with said first portion a spring clip to receive the neck of a bottle, and a releasable clamp to secure a cutting blade on said support with its edge extending into the space defined by said clip to cut the seal of a bottle neck therein.

CHARLES F. DIMITRUK.

REFERENCES CITED

The following references are of record in the file of this patent:

UNITED STATES PATENTS

| Number | Name | Date |
| --- | --- | --- |
| 1,102,124 | Baptiste | June 30, 1914 |